United States Patent
Malacara-Carrillo et al.

(10) Patent No.: US 10,797,480 B2
(45) Date of Patent: Oct. 6, 2020

(54) SMART CIRCUIT BREAKER

(71) Applicant: Siemens Industry, Inc., Alpharetta, GA (US)

(72) Inventors: Hector Manuel Malacara-Carrillo, Alpharetta, GA (US); Russell Thomas Watford, Lawrenceville, GA (US); Hai Chen, Duluth, GA (US); William A. King, Jr., Loganville, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 339 days.

(21) Appl. No.: 16/025,511

(22) Filed: Jul. 2, 2018

(65) Prior Publication Data

US 2020/0006934 A1   Jan. 2, 2020

(51) Int. Cl.
*H02H 3/08*   (2006.01)
*H02H 1/00*   (2006.01)
*H04B 17/20*  (2015.01)
*H01H 71/10*  (2006.01)
*H04W 4/50*   (2018.01)

(52) U.S. Cl.
CPC .............. *H02H 3/08* (2013.01); *H01H 71/10* (2013.01); *H02H 1/0007* (2013.01); *H02H 1/0092* (2013.01); *H04B 17/20* (2015.01); *H04W 4/50* (2018.02)

(58) Field of Classification Search
CPC ...... H02H 1/0007; H02H 1/0092; H02H 3/08; H01H 71/123; H01H 71/10; H01H 71/2463; H01H 2300/03; H04B 17/20; H04W 4/30; H04W 4/50
USPC ........................................................ 361/93.2
See application file for complete search history.

(56) References Cited

U.S. PATENT DOCUMENTS

| | | | |
|---|---|---|---|
| 2009/0206059 A1* | 8/2009 | Kiko ................. | H02J 13/00006 218/143 |
| 2014/0321013 A1* | 10/2014 | Drake ................. | H01H 33/285 361/78 |
| 2015/0326001 A1* | 11/2015 | Emerson ............... | H02H 3/006 361/93.2 |
| 2016/0358722 A1* | 12/2016 | Lakshmanan ........... | H01H 9/54 |

\* cited by examiner

*Primary Examiner* — Kevin J Comber

(57) ABSTRACT

A smart residential circuit breaker includes a hybrid assembly that incorporates a solid-state circuit element integrated into a simplified mechanical pole having main contacts. The solid-state circuit element includes a printed circuit board (PCB) with a micro SD reader to provide faster opening speeds. The smart residential circuit breaker is configured for use for different current levels and controlled by the PCB. The smart residential circuit breaker includes a mag-latch. The PCB is configured to send a signal to the mag-latch to open and close the main contacts within microseconds of detecting an over-current.

16 Claims, 11 Drawing Sheets

SMART CIRCUIT BREAKER

BACKGROUND

1. Field

Aspects of the present invention generally relate to smart circuit breakers and in particular to smart residential circuit breakers.

2. Description of the Related Art

Due to the enormous demand of energy worldwide, usage of alternative energy production methods has increased. In response to this changing energy landscape, power distribution companies are working on innovations to safely manage and distribute the energy produced. At the same time, the ushering in of the digital/communication age is putting a premium on products that provide customers with data and the ability to control devices. These two major trends provide an opportunity to incorporate new technology into residential circuit breakers.

Many digital enabled services exist, including but not limited to: the ability to provide customers with visibility to their energy usage, the ability for remote control of a circuit breaker, and the ability to notify customers about events in their panel. Innovating in these areas for residential circuit breakers will make manufacturers more competitive as they move towards a more connected future.

On the technical side, current residential circuit breaker designs are subjected to undesirable characteristics such as long arcing times and switch bouncing, both of which result in contact damage. They need to solve these issues to exhibit faster switching times that will result in higher reliability and a longer lifetime of the circuit breaker due to the lowered risk of arcing. To quantify the difference in switching time, current circuit breakers switch in a matter of milliseconds, while a design is required that will switch in a matter of microseconds.

Therefore, there is a need for innovating smart residential circuit breakers by manufacturers to stay competitive as world moves towards a more connected future.

SUMMARY

Briefly described, aspects of the present invention relate to a new structure being added to a smart or hybrid circuit breaker with main contacts in terms of a communication facility. The smart or hybrid circuit breaker accomplishes this with the use of a wireless module such as a Wi-Fi module, a software module with an algorithm, a mag-latch and a microprocessor. These components add the ability for communications within a smart or hybrid residential circuit breaker. The smart or hybrid circuit breaker includes a hybrid assembly that incorporates a solid-state circuit element integrated into a simplified mechanical pole having main contacts. The solid-state circuit element includes a printed circuit board (PCB) with a micro SD reader. A micro SD card determines an amperage rating of the smart or hybrid circuit breaker by a number of exposed pins. The algorithm would identify a number of active pins and with preset conditions identify the amperage rating. The algorithm of the software module monitors a breaker signal and communicates with the Wi-Fi module. This signal can then be transmitted to a receiver in a cell phone. For example, a cell phone application (APP) would receive the signal and display a predetermined information sent from the Wi-Fi module. The algorithm of the software module monitors the smart or hybrid circuit breaker for arc, ground fault, overload or increased instantaneous levels. Based on preset conditions, the mag-latch is configured to be activated to open the main contacts of the smart or hybrid circuit breaker. This monitoring within the algorithm is configured to send a signal to the Wi-Fi module. The Wi-Fi module is configured to send a signal to the receiver of the mobile device such as the cell phone to display the information in the cell phone APP. While the hybrid circuit breaker includes a push to test button to manually turn the device on or off. The cell phone APP application would provide a means to send a signal to the Wi-Fi module within the circuit breaker. Once the algorithm receives a signal from the APP application, a signal would be sent to the mag-latch to open or close.

In accordance with one illustrative embodiment of the present invention, a smart circuit breaker is provided that comprises a wireless communication module, a storage device to store a software module comprising instructions, a hybrid assembly and a mag-latch. The wireless communication module is configured to communicate with an application (APP) stored on a mobile device of a user. The software module is to be executed by a controller. The software module is configured to monitor the smart circuit breaker for at least one of arc, ground fault, overload or increased instantaneous levels. The hybrid assembly incorporates a solid-state circuit element integrated into a simplified mechanical pole having main contacts. The solid-state circuit element includes a printed circuit board (PCB) with a micro SD reader to provide a signal for faster opening speeds. The smart circuit breaker is configured for use for different current levels and controlled by the PCB. The PCB includes a microprocessor and the software module comprising the instructions to communicate with the wireless communication module. The PCB is configured to send a signal to the mag-latch to open and close the main contacts within microseconds of detecting an over-current.

In accordance with another illustrative embodiment of the present invention, a smart residential circuit breaker is provided that includes a hybrid assembly that incorporates a solid-state circuit element integrated into a simplified mechanical pole having main contacts. The solid-state circuit element includes a printed circuit board (PCB) with a micro SD reader to provide faster opening speeds. The smart residential circuit breaker is configured for use for different current levels and controlled by the PCB. The smart residential circuit breaker includes a mag-latch. The PCB is configured to send a signal to the mag-latch to open and close the main contacts within microseconds of detecting an over-current.

DETAILED DESCRIPTION

To facilitate an understanding of embodiments, principles, and features of the present invention, they are explained hereinafter with reference to implementation in illustrative embodiments. In particular, they are described in the context of a smart or a hybrid circuit breaker with digital enabled services including but not limited to: an ability to provide customers with visibility to their energy usage, an ability for remote control of a circuit breaker, and an ability to notify customers about events in their panel. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

In one embodiment, a smart or a hybrid circuit breaker includes algorithms to determine an amperage rating using an SD card. A Wi-Fi module is integrated to provide a signal to a receiver in a receiving device such as a cell phone. A mag-latch is directly connected to a moveable contact arm with a contact. A push to test button to manually send a signal to the mag-latch to open or close the main contacts of the smart or the hybrid circuit breaker. A visual display is configured to show the status and/or error messages of the smart or a hybrid circuit breaker.

The advantages of the smart and the hybrid circuit breaker include: the ability of the user to better understand what is the breaker status without opening the panel door. People are typically unaware or afraid to open the panel. The smart and the hybrid circuit breaker alerts the end user that there is a breaker that has tripped or that there is an issue with a circuit breaker. Today this is only known if the power goes off in a room the person is in. In this case, the user may open the panel but maybe unaware which circuit is open. The ability is provided to change the amperage rating by swapping out a micro SD card. A micro SD card could be identified by the number of active pins to determine the amperage rating. The smart and the hybrid circuit breaker combines the ability of opening or closing a circuit with a combination of components. In this case, a Wi-Fi module (in the breaker), receivers (in the cell phone) and a software interface are deployed.

Figure 1:
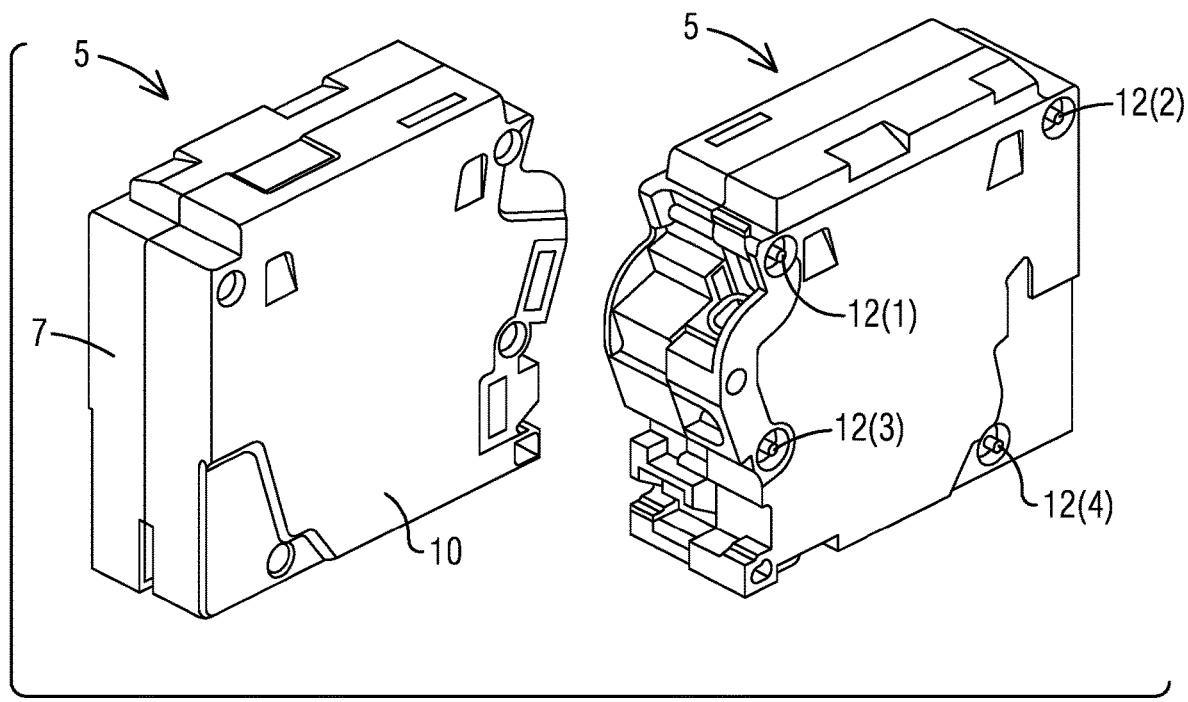
FIG. 1 illustrates a smart or a hybrid circuit breaker in accordance with an exemplary embodiment of the present invention.

Consistent with one embodiment of the present invention, FIG. 1 represents a representation of perspective views of a smart and the hybrid circuit breaker 5 comprising a communications facility (not seen) that is configured to provide digital enabled services including but not limited to: an ability to provide customers with visibility to their energy usage, an ability for remote control of a circuit breaker, and an ability to notify customers about events in their panel in accordance with an exemplary embodiment of the present invention. The smart or hybrid circuit breaker 5 includes a wireless module such as a Wi-Fi module, a software module with an algorithm, a mag-latch and a microprocessor. These components add the ability for communications within the smart or hybrid residential circuit breaker 5. The smart or hybrid circuit breaker 5 includes a hybrid assembly that incorporates a solid-state circuit element (not seen) integrated into a simplified mechanical pole having main contacts. The solid-state circuit element determines an amperage rating of the smart or hybrid circuit breaker 5.

A general overview or a foot print of the smart and the hybrid circuit breaker 5 is shown in FIG. 1. The smart or hybrid circuit breaker 5 comprises a base 7, a cover 10 and a set of four rivets 12(1-4) to hold the base 7 and the cover 10 together.

Figure 2:
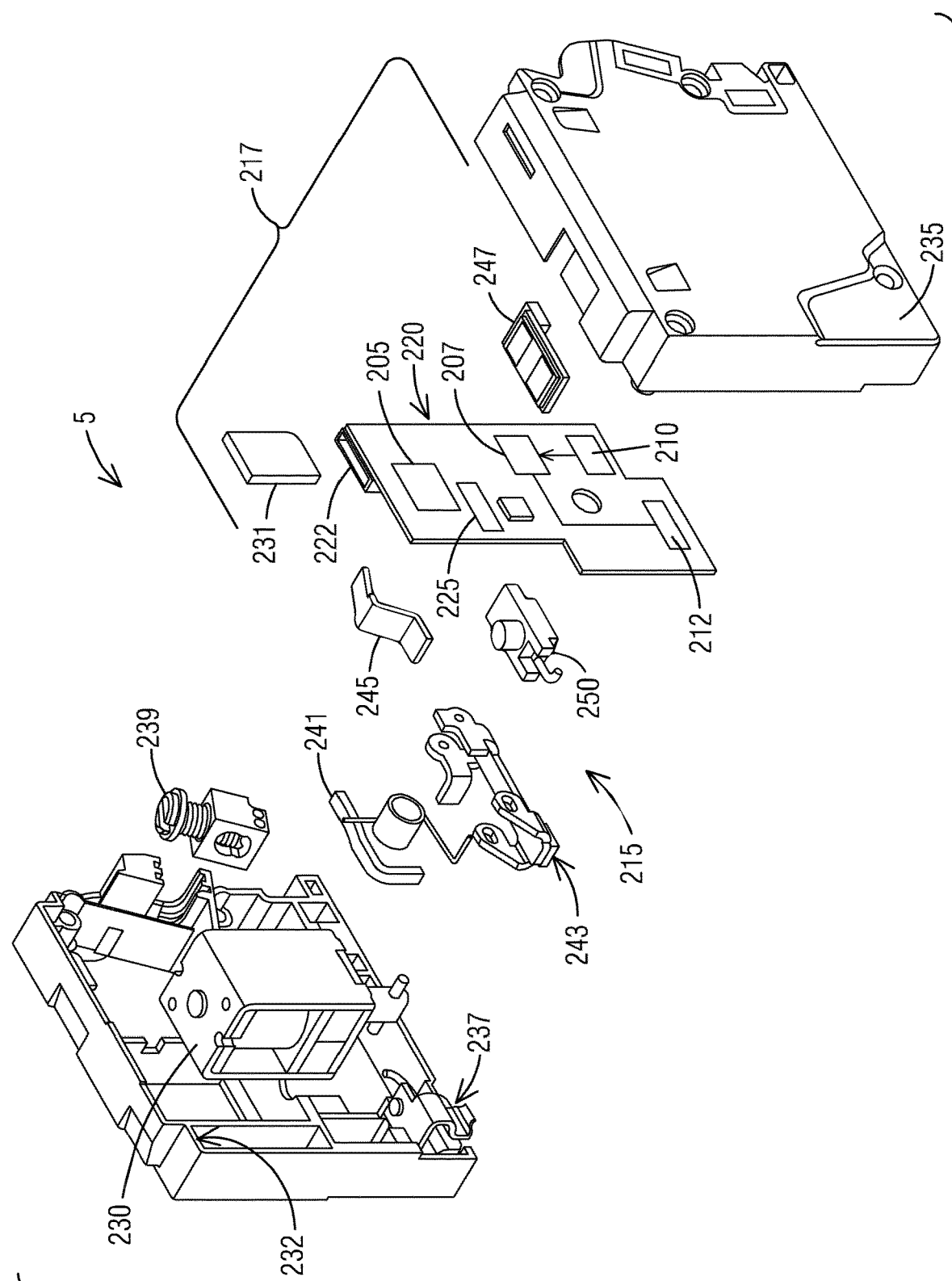
FIG. 2 illustrates schematically an exploded view of the smart or the hybrid circuit breaker of FIG. 1 in accordance with embodiments disclosed herein.

Referring to FIG. 2, it illustrates schematically an exploded view of the smart or the hybrid circuit breaker 5 of FIG. 1 in accordance with embodiments disclosed herein. The smart or hybrid circuit breaker 5 includes a wireless communication module 205 configured to communicate with an application (APP) stored on a mobile device of a user. The smart or hybrid circuit breaker 5 further includes a storage device 207 to store a software module 210 comprising instructions to be executed by a controller 212. The software module 210 is configured to monitor the smart or hybrid circuit breaker 5 for at least one of arc, ground fault, overload or increased instantaneous levels.

The smart or hybrid circuit breaker 5 further includes a hybrid assembly 215 that incorporates a solid-state circuit element 217 integrated into a simplified mechanical pole having main contacts. The solid-state circuit element 217 includes a printed circuit board (PCB) 220 with a micro SD reader 222 to provide a signal for faster opening speeds. The smart or hybrid circuit breaker 5 is configured for use for different current levels and controlled by the PCB 220. The PCB 220 includes a microprocessor 225 and the software module 210 comprising the instructions to communicate with the wireless communication module 205. The smart or hybrid circuit breaker 5 further includes a mag-latch 230. The PCB 220 is configured to send a signal to the mag-latch 230 to open and close the main contacts within microseconds of detecting an over-current.

A micro SD card 231 determines an amperage rating of the smart or the hybrid circuit breaker 5 by a number of exposed pins. An algorithm of the software module 210 identifies a number of active pins and with preset conditions identifies the amperage rating. The algorithm of the software module 210 monitors a breaker signal and communicates with the wireless communication module 205 such as a Wi-Fi module. This signal can then be transmitted to a receiver in a cell phone.

The smart or the hybrid residential circuit breaker 5 provides a user with direct breaker status without the need to locate and open a panel door. For example, ON, OFF or an error message may be provided. The present invention introduces a communications facility in the smart or a hybrid residential circuit breaker 5 that can easily display information to an end user. With the reduction of mechanical components needed to open and close the main contacts, the main contacts can be separated quicker using a signal that is sent to the mag-latch 230.

A typical residential circuit breaker consists of a handle, an armature, a cradle, a bimetal, a movable arm with a contact and a cradle to armature latching surface to function properly. A smart or a hybrid residential circuit breaker mechanism does not need a cradle to armature latch surface. The smart or a hybrid residential circuit breaker 5 does not include a bimetal and therefore does not require thermal calibration in a factory. Thermal calibration of a typical residential circuit breaker requires constant monitoring and consistent audits to verify production lots.

The smart or hybrid circuit breaker 5 further includes a base 232 and a cover 235 which can be attached with rivets or snaps. The base 232 includes a line terminal 237 and a lug connector 239. The smart or hybrid circuit breaker 5 further includes a flexible braid 241, a contact arm 243 and a load terminal 245. The smart or hybrid circuit breaker 5 further includes a digital status indicator 247.

The mag-latch 230 is a device that opens and closes the smart or hybrid circuit breaker 5 every time a signal is received from the PCB 220. The mag-latch 230 also has an incorporated neutral connection 250 which will avoid an additional step to connect the neutral for the customer. The copper alloy contact arm 243 is attached to the mag-latch 230 and the base 232. In the contact arm 243, one side of the copper alloy flexible braid 241 is mechanically attached to the contact arm 243 and the other end of the flexible braid 241 is mechanically attached to the load terminal 245 of the smart or hybrid circuit breaker 5 that at the same time is mechanically connected with the lug connector 239. To close the smart or hybrid circuit breaker 5 the line terminal 237 is assembled into the base 232 and the cover 235.

The smart or the hybrid circuit breaker 5 further comprises the micro SD card 231 (e.g., a generally known memory card for storage) that determines an amp rating of the smart or the hybrid circuit breaker 5 by a number of exposed active pins. The software module 210 is configured to identify the number of exposed active pins and based on one or more preset conditions identify the amp rating. The software module 210 monitors arc, ground fault, overload or increased instantaneous levels to communicate a breaker signal to the wireless communication module 205 being a Wi-Fi module. The breaker signal is then transmitted to a receiver in the mobile device being a cell phone such that the APP receives the breaker signal and displays predetermined information sent from the wireless communication module 205. The APP is configured to send a first signal to the wireless communication module 205 such that the software module 210 receives the first signal from the APP in order to send a second signal to the mag-latch 230 to open or close.

Based on one or more preset conditions, the mag-latch 230 is activated to open the contacts of the smart or the hybrid circuit breaker 5. The mag-latch 230 is directly connected to a moveable contact arm with a contact and the main contacts are separated using a signal that is sent to the mag-latch 230.

The software module 210 to determine an amp rating of the smart or the hybrid circuit breaker 5 using the micro SD card 231 such that the wireless communication module 205, i.e., the Wi-Fi module in the mobile device is configured to send a signal of an amperage rating to use in the smart or the hybrid circuit breaker 5 to the wireless communication module 205 of the PCB 220 which sends a signal to the software module 210 to program the amperage rating to use. The wireless communication module 205 is integrated into the smart or the hybrid circuit breaker 5 to provide a signal to be received in the mobile device being a cell phone.

The smart or the hybrid circuit breaker 5 further comprises a push to test button to manually turn the smart or the hybrid circuit breaker 5 ON or OFF. The push to test button to manually send a signal to the mag-latch 230 to open or close the main contacts.

The smart or the hybrid circuit breaker 5 further comprises a display to visually show at least one of status and error messages of the smart or the hybrid circuit breaker 5. The smart or the hybrid circuit breaker 5 provides a user with a direct breaker status without the need to locate and open a panel door.

In the smart or the hybrid circuit breaker 5, a cradle to armature latch surface of the smart circuit breaker is not provided. A bimetal of the smart or the hybrid circuit breaker 5 is not provided and therefore does not require a thermal calibration in a factory.

The smart or the hybrid circuit breaker 5 further comprises a first self-test module (see a self-test module of FIG. 17) comprising instructions that if not functioning properly will automatically open the main contacts and disable the smart circuit breaker. The smart or the hybrid circuit breaker 5 further comprises a second self-test module (see a self-test module of FIG. 17) comprising instructions that if not functioning properly will prevent the mag-latch from receiving a signal to close the main contacts.

The smart or the hybrid circuit breaker 5 is configured to alert an end user that a breaker trip has occurred or that there is an issue with a circuit breaker operation. The smart or the hybrid circuit breaker 5 is configured to provide an ability to change an amp rating by swapping out a micro SD card.

Figure 3:
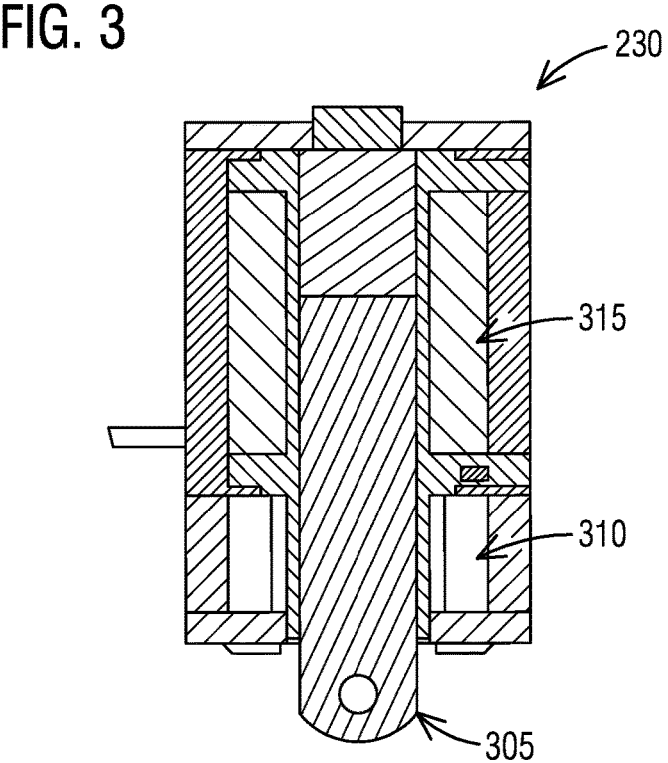
FIG. 3 illustrates a view of the mag-latch of the smart or the hybrid circuit breaker in accordance with an exemplary embodiment of the present invention.

Turning now to FIG. 3, it illustrates a view of the mag-latch 230 of the smart or the hybrid circuit breaker 5 in accordance with an exemplary embodiment of the present invention. The mag-latch 230 may operate with a 24±2.5 VDC pulse. Aside from a frame and supports, the mag-latch 230 includes some basic components. For example, the mag-latch 230 includes a mag-latch plunger 305, a permanent magnet 310 and a coil 315. A 24 VDC pulse is applied to the mag-latch 230 for 23-25 milliseconds to retract the mag-latch plunger 305 and less than 5 milliseconds to extend the mag-latch plunger 305.

Figure 4:
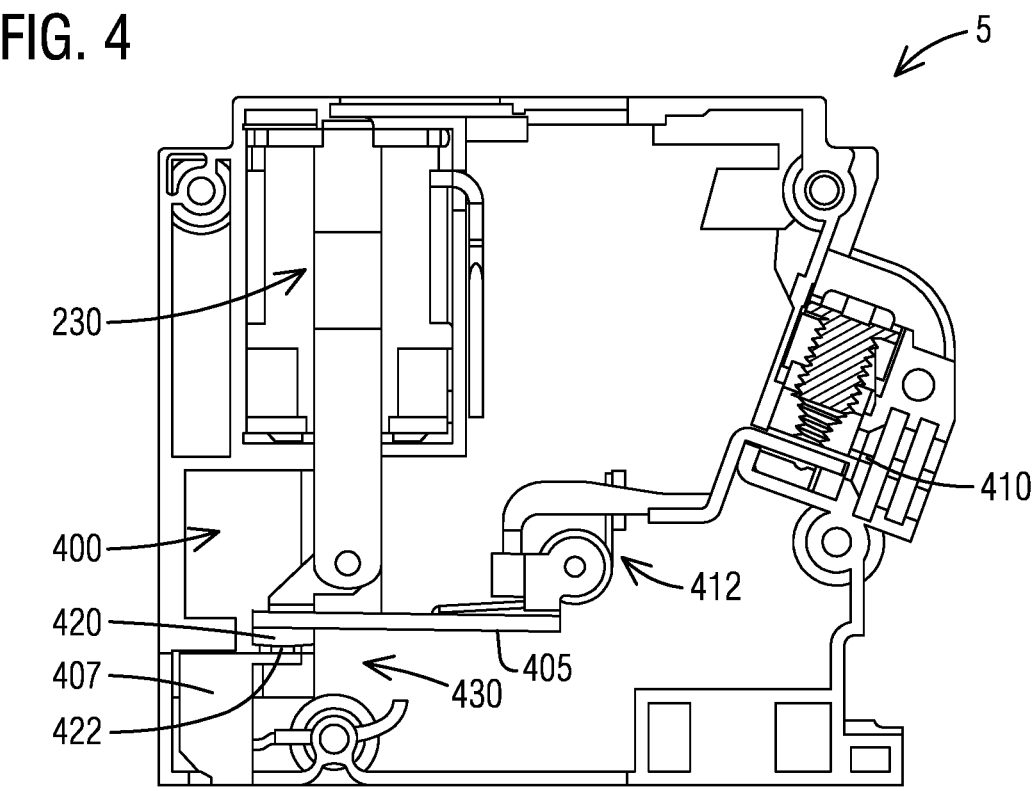
FIG. 4 illustrates schematically a cross-sectional view of the smart or the hybrid circuit breaker in an ON position in accordance with an exemplary embodiment of the present invention.

FIG. 4 illustrates schematically a cross-sectional view of the smart or the hybrid circuit breaker 5 in an ON position in accordance with an exemplary embodiment of the present invention. The smart or the hybrid circuit breaker 5 includes an area for an arc chamber 400 and a contact system including a movable contact arm 405 and a stationary terminal 407. The smart or the hybrid circuit breaker 5 further includes a device load terminal 410, a torsion spring 412 and the mag-latch 230.

When the smart or the hybrid circuit breaker 5 in ON position the PCB 220 de-energizes the mag-latch 230 and the torsion spring 412 that is attached between the contact arm 243 and the base 232 close the contact arm 243 until a movable contact 420 make contact with a stationary contact 422 of the line terminal 237. The fast opening of the smart or the hybrid circuit breaker 5 will be possible by the PCB 220 (shown in FIG. 2), that is integrated to this device. The PCB 220 will send a signal to the mag-latch 230 to open main contacts 430 within microseconds of detecting an over-current.

Figure 5:
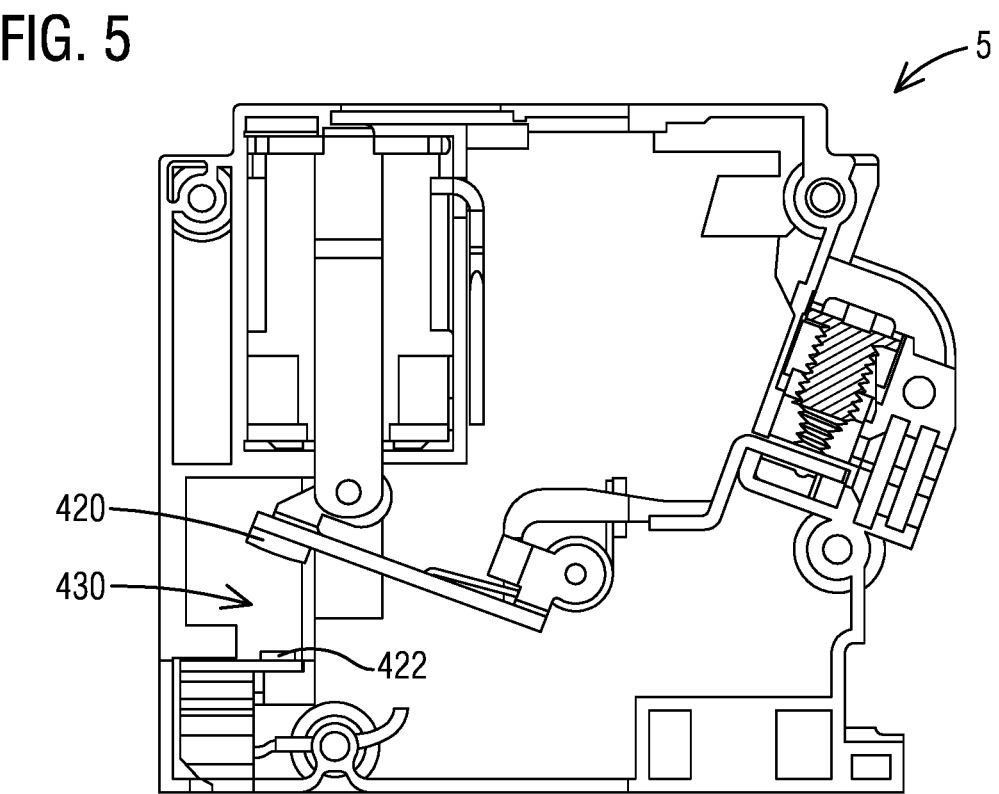
FIG. 5 illustrates schematically a cross-sectional view of the smart or the hybrid circuit breaker in an OFF position in accordance with an exemplary embodiment of the present invention.

As seen in FIG. 5, it illustrates schematically a cross-sectional view of the smart or the hybrid circuit breaker 5 in an OFF position in accordance with an exemplary embodiment of the present invention. When the PCB 220 receives a signal to turn OFF the smart or the hybrid circuit breaker 5, the mag-latch 230 is reenergized and a magnet overcomes the force of the torsion spring 412 to open the main contacts 430. An open area is provided where the arc chamber 400 is located for arc extinguishing.

Figure 6:
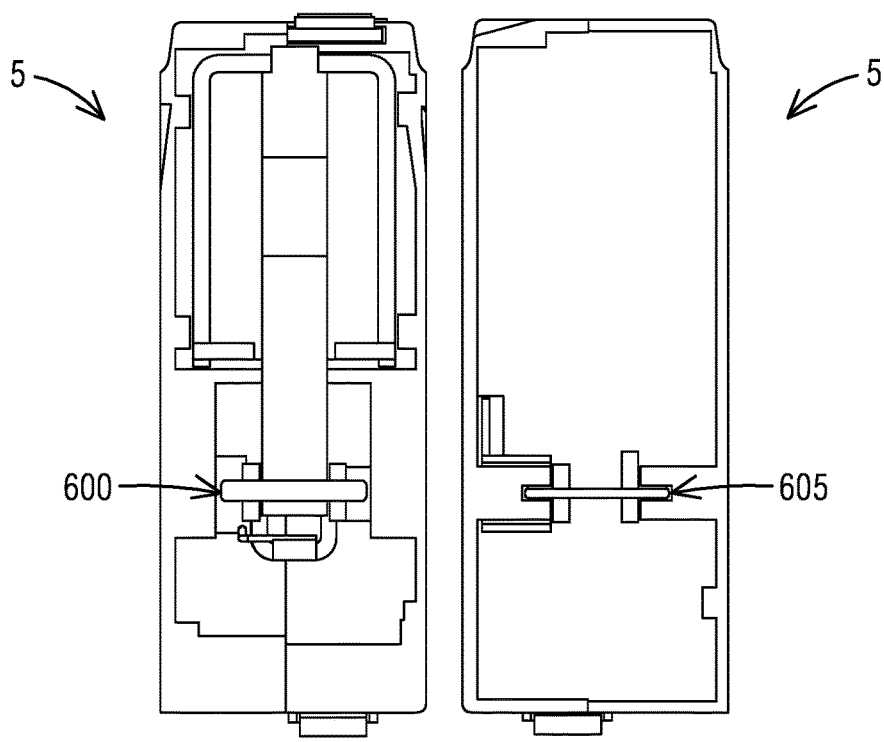
FIG. 6 illustrates schematically means of attachment of a contact arm with a mag-latch and the contact arm with a base in accordance with an exemplary embodiment of the present invention.

As shown in FIG. 6, it illustrates schematically means of attachment of the contact arm 243 with the mag-latch 230 and the contact arm 243 with the base 232 in accordance with an exemplary embodiment of the present invention. A contact arm pivot pin 600 is used to mechanically attach the contact arm 243 with the mag-latch 230 and a pivot pin 605 is used to assemble the contact arm 243 to the base 232. In this way, a mag-latch and a contact arm interface is provided.

Figure 7:
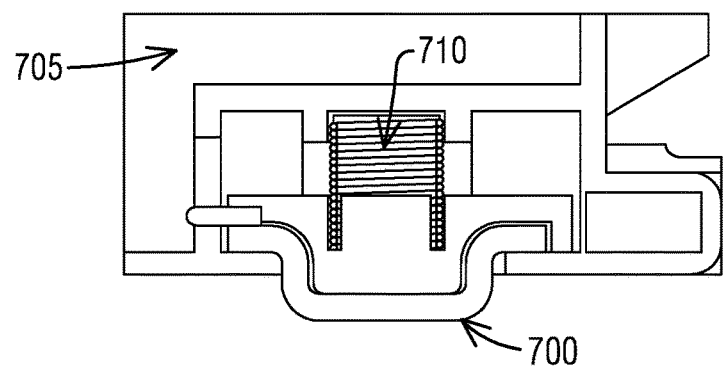
FIG. 7 illustrates a view of a neutral connection that is assembly between a base and a cover in accordance with an exemplary embodiment of the present invention.

In FIG. 7, it illustrates a view of a neutral connection 700 that is an assembly between a base 705 and a cover in accordance with an exemplary embodiment of the present invention. This neutral connection 700 replaces a regular "pig tail" wire used in a regular electronic circuit breaker. This neutral connection 700 facilitates the electrical installation process. The way that a neutral bar is intended to work is that when the smart or the hybrid circuit breaker 5 is installed in a load center or a panel board the neutral connection 700 feature will make contact with the neutral bar of the system providing a neutral connection to the smart or the hybrid circuit breaker 5 that is required in every installation for residential application. Between the neutral connection 700 feature and the base 705 a compression spring 710 is assembled that is there to provide or translate the proper contact force required to have a good connection between the neutral connection 700 and the neutral bar of the system.

Figure 8:
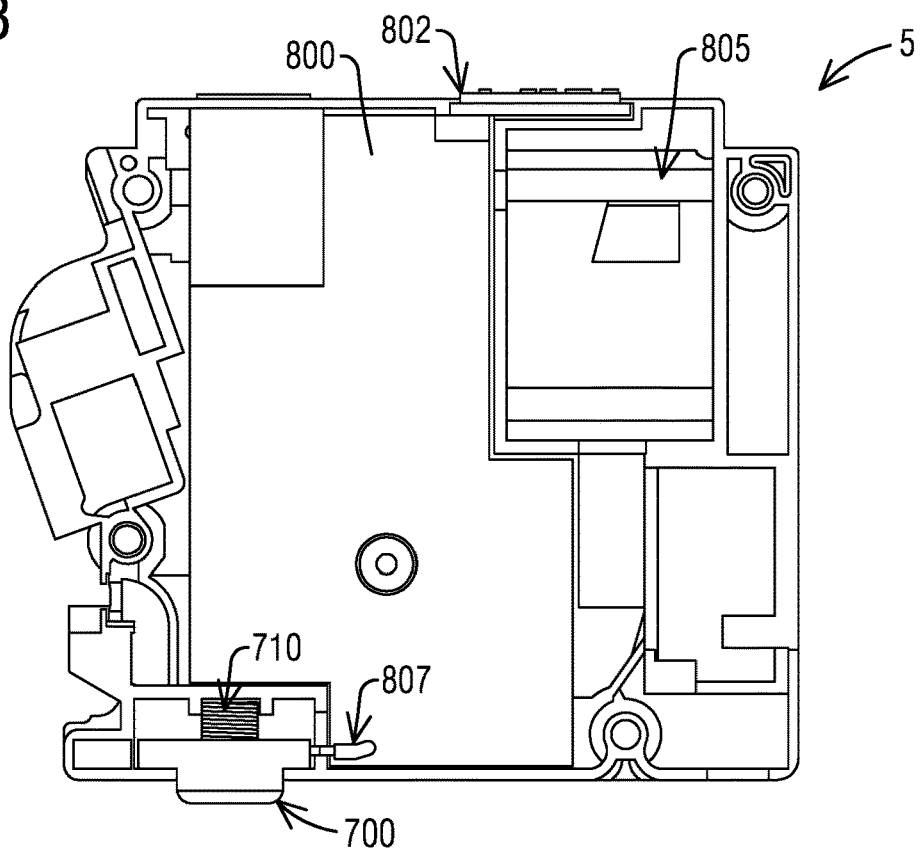
FIG. 8 illustrates a view of a PCB and a digital status indicator assembled into the cover of the smart or the hybrid circuit breaker in accordance with an exemplary embodiment of the present invention.

With regard to FIG. 8, it illustrates a view of a PCB 800 and a digital status indicator 802 assembled into a cover 805 of the smart or the hybrid circuit breaker 5 in accordance with an exemplary embodiment of the present invention. Also, in this same FIG. 8 an electrical connection 807 between the neutral connection 700 feature and the PCB 800 is shown.

Figure 9:
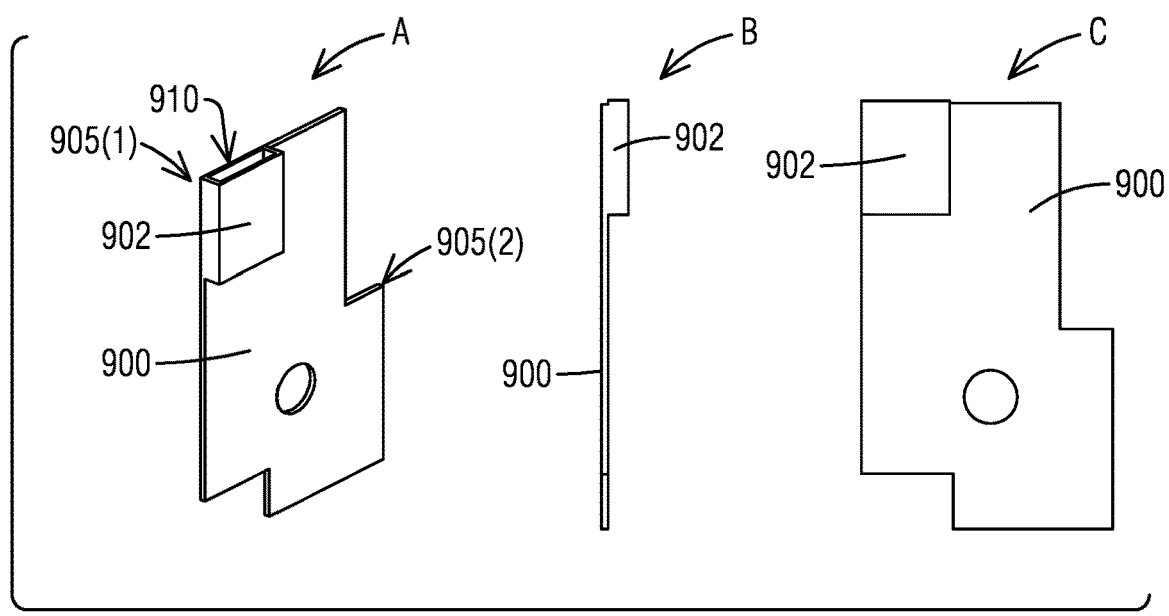
FIG. 9 illustrates a PCB with a micro SD reader in accordance with an exemplary embodiment of the present invention.

With respect to FIG. 9, it illustrates several views of a PCB 900 with a built-in micro SD reader 902 in accordance with an exemplary embodiment of the present invention. In particular, a view (A) is a perspective view, a view (B) is a side view and a view (C) is a front view.

The PCB 900 may have a first corner 905(1) and a second corner 905(2) which is offset from the first corner 905(1). The micro SD reader 902 may be situated at an edge on the first corner 905(1). The micro SD reader 902 may have an opening 910 to receive a micro SD card (not shown). The micro SD reader 902 is an example of a memory card reader so other card readers than micro SD card readers are also contemplated.

Figure 10:
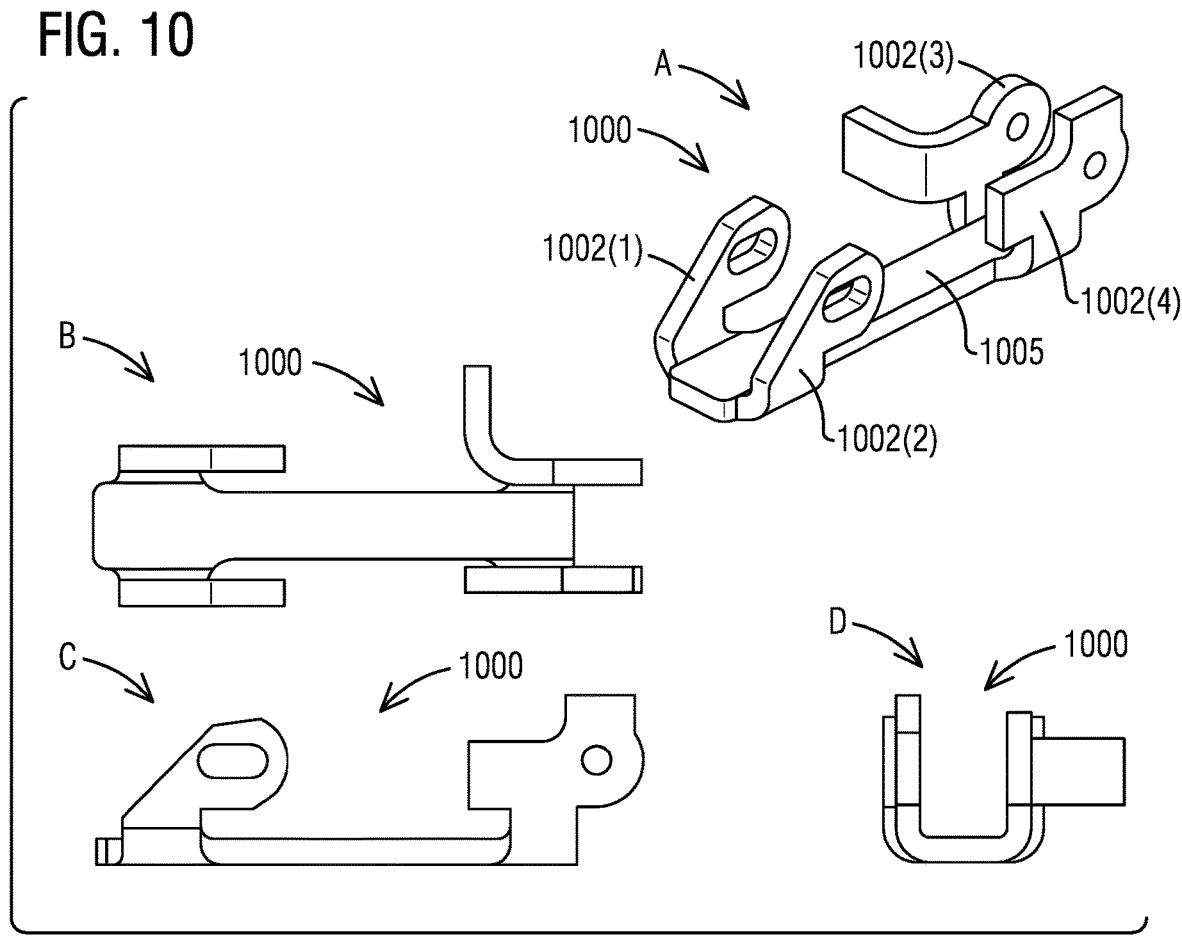
FIG. 10 illustrates multiple views of a contact arm in accordance with an exemplary embodiment of the present invention.

FIG. 10 illustrates multiple views of a contact arm 1000 in accordance with an exemplary embodiment of the present invention. In particular, a view (A) is a perspective view, a view (B) is a top view, a view (C) is a front view and a view (D) is a side view. The contact arm 1000 includes four arms 1002(1-4) extending from a base plate 1005. One of the arms of the four arms 1002(1-4) is located on each corner of the base plate 1005. Two of the arms 1002(1-2) are identical and other two 1002(3-4) are different. The fourth arm 1002(4) has a curved side end extending away sideways from the base plate 1005.

Figure 11:
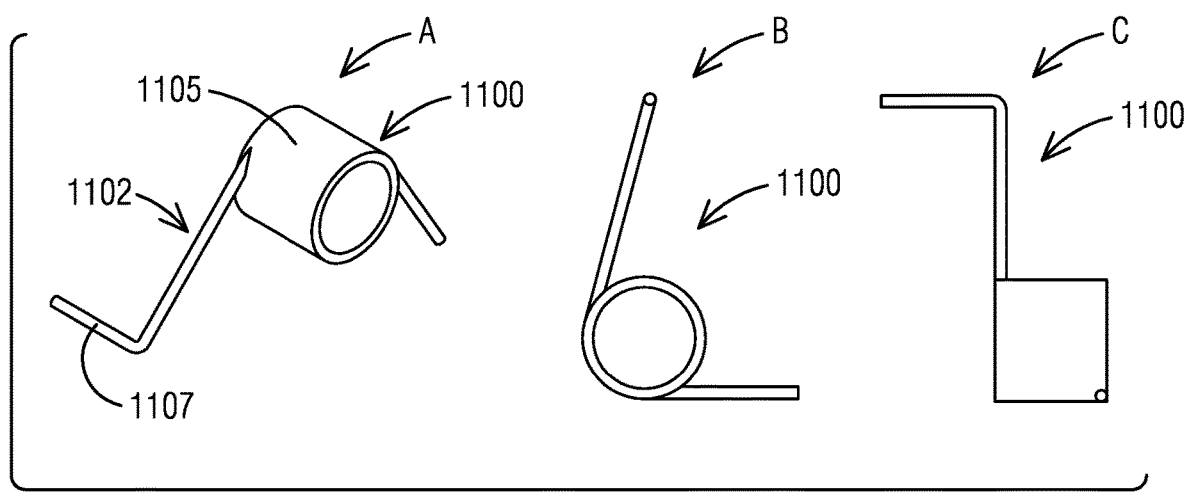
FIG. 11 illustrates multiple views of a torsion spring in accordance with an exemplary embodiment of the present invention.

FIG. 11 illustrates multiple views of a torsion spring 1100 in accordance with an exemplary embodiment of the present invention. In particular, a view (A) is a perspective view, a view (B) is a front view and a view (C) is a side view. The torsion spring 1100 comprises a spring 1102 with two aims and a coil 1105. The torsion spring 1100 comprises an arm 1107 extending away from the spring 1102.

Figure 12:
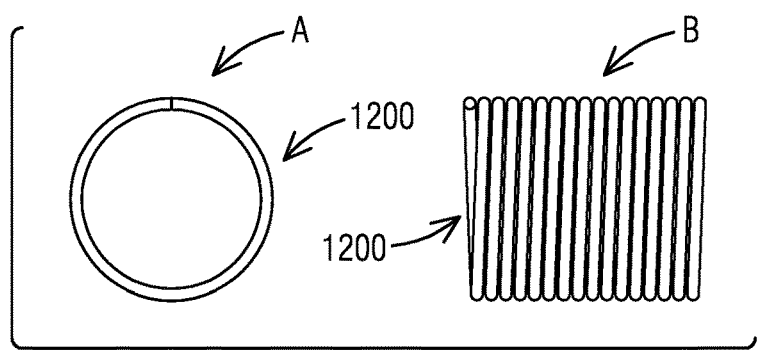
FIG. 12 illustrates multiple views of a compression spring in accordance with an exemplary embodiment of the present invention.
Figure 13:
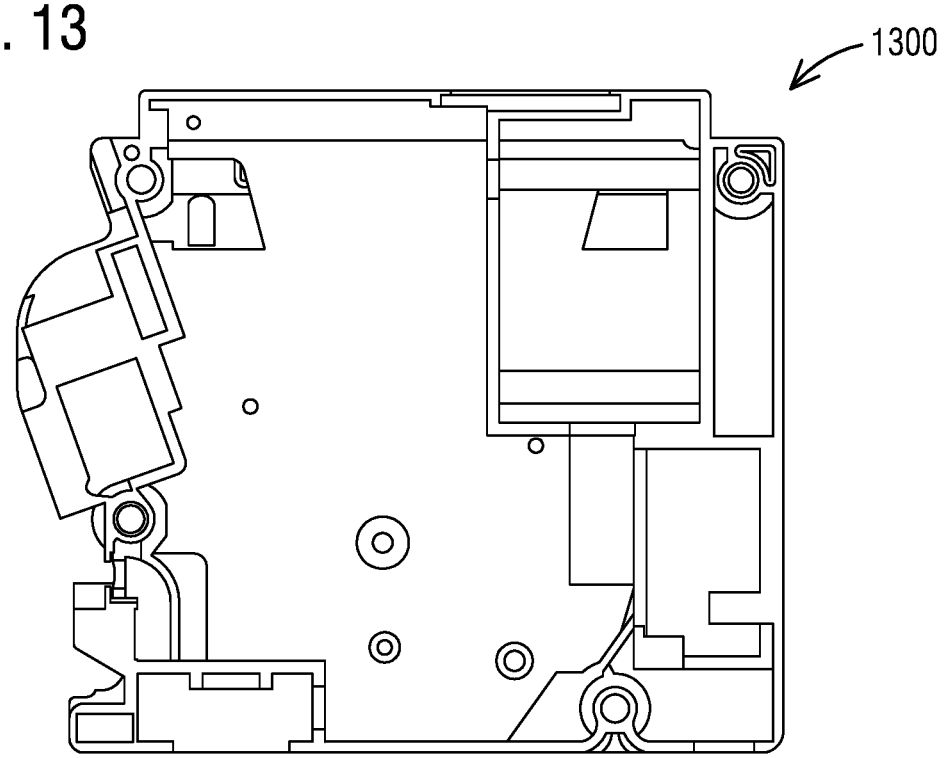
FIG. 13 illustrates a view of a cover in accordance with an exemplary embodiment of the present invention.
Figure 14:
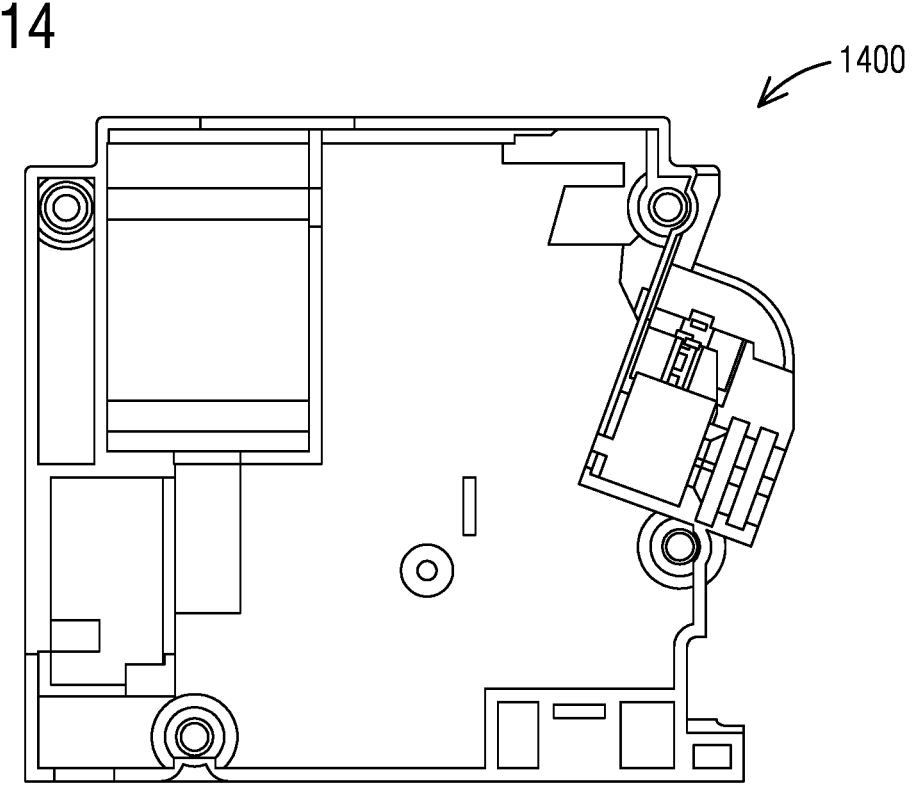
FIG. 14 illustrates a view of a base in accordance with an exemplary embodiment of the present invention.

FIG. 12 illustrates multiple views of a compression spring 1200 in accordance with an exemplary embodiment of the present invention. In particular, a view (A) is a side view and a view (B) is a front view. FIG. 13 illustrates a view of a cover 1300 in accordance with an exemplary embodiment of the present invention. FIG. 14 illustrates a view of a base 1400 in accordance with an exemplary embodiment of the present invention.

Figure 15:
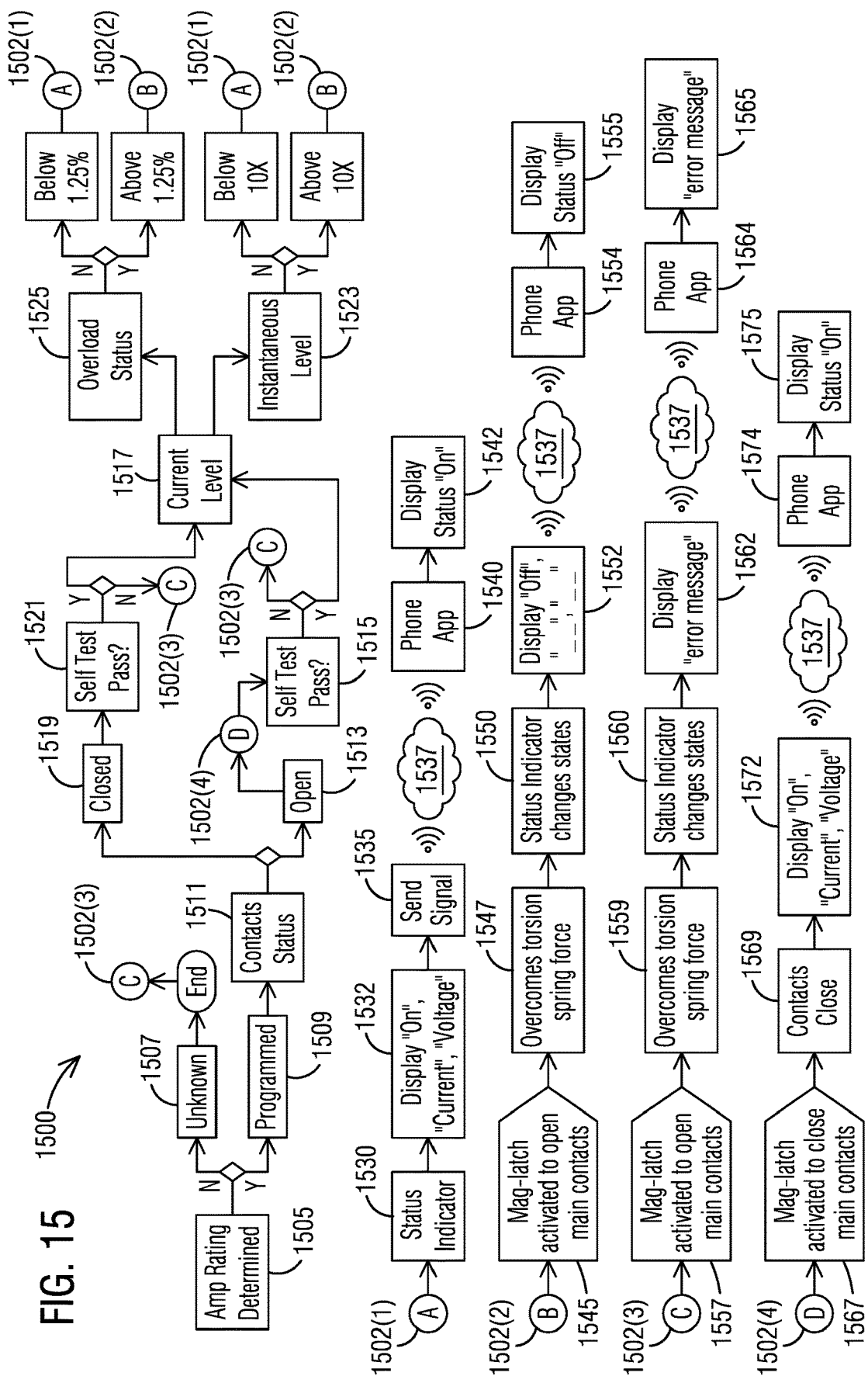
FIG. 15 illustrates the smart or a hybrid circuit breaker 5 with software functions in accordance with an exemplary embodiment of the present invention.

FIG. 15 illustrates the smart or a hybrid circuit breaker 5 with software functions in accordance with an exemplary embodiment of the present invention. A flow chart 1500 of software functions include four subroutines—A, B, C, D 1502(1-4). At step 1505 an amp rating is determined. If a decision is no "N" meaning it is unknown at step 1507 then the process ends and initiates the subroutine C 1502(3). If a decision is yes "Y" meaning it is programmed at step 1509 then the process checks contact status in step 1511. If the contact status is "open" at step 1513 the subroutine D 1502(4) is to be executed. Then a self test pass check is made a step 1515. If not (N) "pass" then the subroutine C 1502(3) is executed. If "pass" is yes "Y" a current level check is made at step 1517. If the contact status is "closed" at step 1519 then a self test pass check is made at step 1521. If not (N) "pass" then the subroutine C 1502(3) is executed. If "pass" is yes "Y" a current level check is made at the step 1517.

From the current level in step 1517, check an instantaneous level in step 1523. If the instantaneous level is below 10× then run the subroutine A 1502(1). However, if the instantaneous level is above 10× then run the subroutine B 1502(2). From the current level in step 1517, check an overload status in step 1525. If the overload status is below 1.25% then run the subroutine A 1502(1). However, if the overload status is above 1.25% then run the subroutine B 1502(2).

The subroutine A 1502(1) includes a status indicator step 1530 and a step of displaying 1532 as "On", "Current" or "Voltage". Next a send signal step 1535 sends a signal via a network 1537 such as Internet to a phone APP in step 1540. A display status "On" is displayed in step 1542.

The subroutine B 1502(2) includes in step 1545 a mag-latch is activated to open main contacts. In step 1547, the device overcomes a torsion spring force. Then in step 1550, the status indicator changes states. Next is a step of displaying 1552 as "Off", "--", "--." Next via the network 1537 such as Internet the subroutine B 1502(2) sends a signal to a phone APP in step 1554. A display status "Off" is displayed in step 1555.

The subroutine C 1502(3) includes in step 1557 a mag-latch is activated to open main contacts. In step 1559, the device overcomes a torsion spring force. Then in step 1560, the status indicator changes states. Next is a step of displaying 1562 as "error message". Next via the network 1537 such as Internet the subroutine C 1502(3) sends a signal to a phone APP in step 1564. A display status "error message" is displayed in step 1565.

The subroutine D 1502(4) includes in step 1567 a mag-latch is activated to close main contacts. In step 1569, the main contacts of the smart and the hybrid circuit breaker 5 close. Next is a step of displaying 1572 as "On", "Current" or "Voltage". Next via the network 1537 such as Internet the subroutine D 1502(4) sends a signal to a phone APP in step 1574. A display status "On" is displayed in step 1575.

In operation, once the smart and the hybrid circuit breaker 5 is activated the software module will make several decisions on the initial status of the smart and the hybrid circuit breaker 5. First step is to determine if a micro SD card is installed and the amp rating for the smart and the hybrid circuit breaker 5 is defined. If no SD card is installed, then the smart and the hybrid circuit breaker 5 starts the subroutine "C" 1502(3). In the subroutine "C" 1502(3), the mag-latch 230 receives a 24 VDC signal for 25 milliseconds in the event that the main contacts are closed. This increases the magnetic field strength and attracts the mag-latch plunger. This magnetic force will overcome the torque applied from the torsion spring to the moveable arm with contact. The moveable contact arm rotates clockwise and separates the main contacts. A predetermined message is displayed in the display screen to alert the consumer. This same message is sent to the cell phone APP application thru Wi-Fi and a receiver in the cell phone. If the main contacts are already open, the predetermined message is sent.

If a SD card is installed, the software module determines if the main contacts 430 are closed or open. In the event that the main contacts 430 are closed, a self test is conducted to ensure that the electronics are working properly. If the self test passes, the current level is monitored and checked for a thermal overload and/or whether an instantaneous condition exists. If the thermal overload is determined to be 1.25% and/or the instantaneous levels are below 10× the smart and the hybrid circuit breaker 5 rating, the subroutine "A" 1502(1) is started. Under these conditions, a predetermined message is displayed on the display screen to indicate the smart and the hybrid circuit breaker 5 is ON along with the current and voltage that is being applied to the smart and the hybrid circuit breaker 5. This same message is sent to the cell phone APP application thru Wi-Fi and a receiver in the cell phone.

If the thermal overload is higher than 1.25% and/or the instantaneous levels are higher than 10× of the smart and the hybrid circuit breaker 5 rating, the subroutine "B" 1502(2) will be initiated. In this routine, the mag-latch 230 is activated with a 24 VDC signal to open the main contacts 430. This increases the magnetic field strength and attracts the mag-latch plunger. This magnetic force will overcome the torque applied from the torsion spring to the moveable arm with contact. The moveable contact arm rotates clockwise separates the main contacts 430. A predetermine message is displayed on the display screen to indicate the smart and the hybrid circuit breaker 5 is OFF along with no current and voltage being applied. This same message is sent to the cell phone APP application thru Wi-Fi and a receiver in the cell phone.

In the event that the main contacts 430 are open, the subroutine "D" 1502(4) is initiated. A 24 VDC signal is sent to the mag-latch for less than 5 milliseconds. This decreases the magnetic field strength and allows the contact arm with contact to rotate counterclockwise to close the main contacts 430. Once the main contacts 430 are closed, a self test is conducted. If the self test passes, the current level is monitored and checked for a thermal overload and/or whether an instantaneous condition exists. If the thermal overload is determined to be 1.25% and/or the instantaneous levels are below 10× the smart and the hybrid circuit breaker 5 rating, the subroutine "A" 1502(1) is started. In the event if the thermal overload is higher than 1.25% and/or the instantaneous levels are higher than 10× of the smart and the hybrid circuit breaker 5 rating, the subroutine "B" 1502(2) will be initiated. In this routine, the mag-latch 230 is activated with a 24 VDC signal to ensure that the main contacts 430 are open. Depending on the subroutine initiated, a predetermined message is displayed on the display screen to indicate the smart and the hybrid circuit breaker 5 is ON or OFF along with the current and voltage that is being applied to the smart and the hybrid circuit breaker 5. This same message is sent to the cell phone APP application thru Wi-Fi and a receiver in the cell phone.

Figure 16:
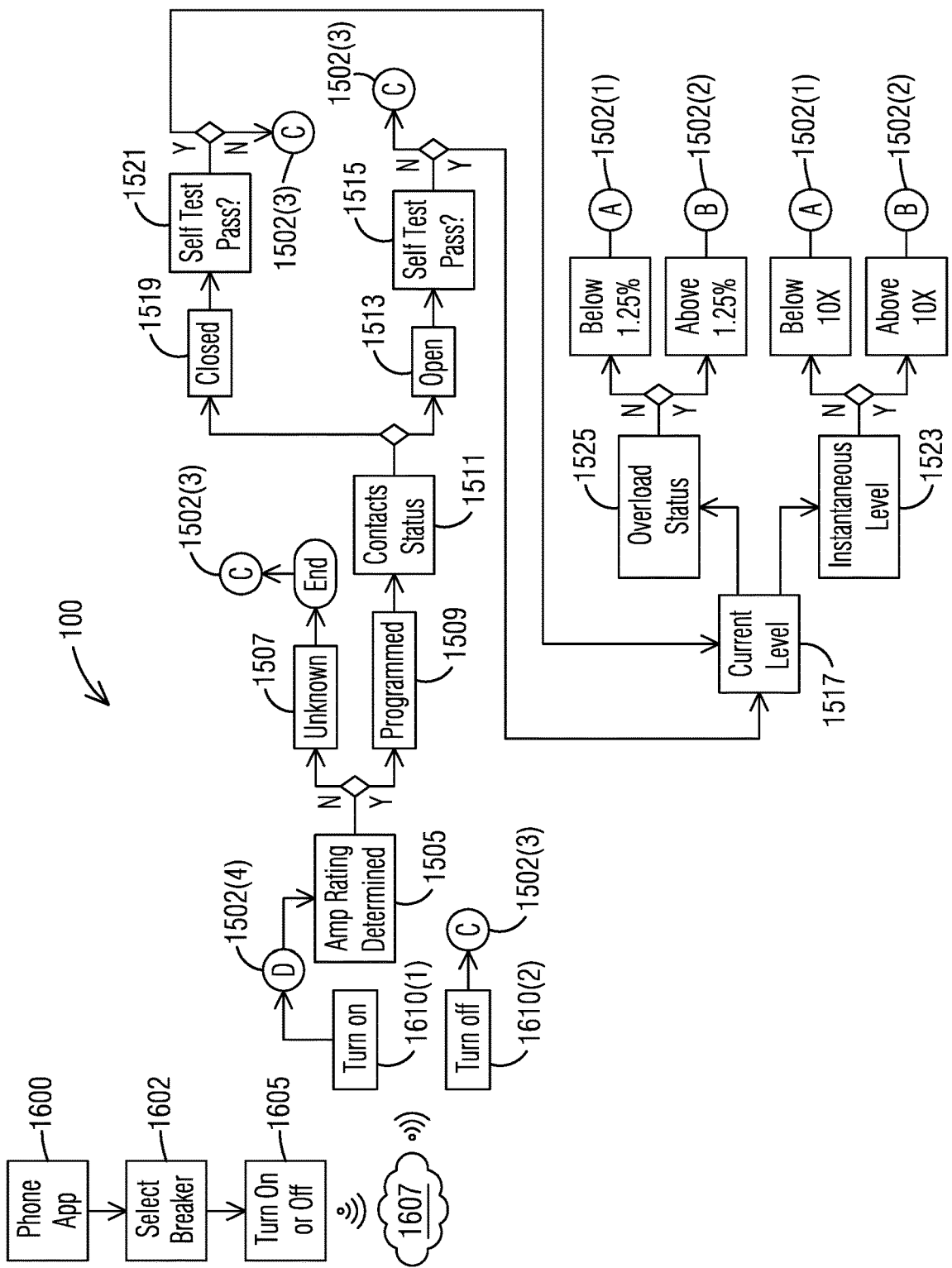
FIG. 16 illustrates the smart or a hybrid circuit breaker 5 turning ON or OFF from a cell phone application (APP) in accordance with an exemplary embodiment of the present invention.

FIG. 16 illustrates the smart or the hybrid circuit breaker 5 turning ON or OFF from a cell phone application (APP) 1600 in accordance with an exemplary embodiment of the present invention. At the cell phone APP 1600, in step 1602 a breaker is selected. Then at step 1605 a user can turn ON or OFF the smart or the hybrid circuit breaker 5. The cell phone APP 1600 on a network 1607 such as Internet via Wi-Fi sends a signal to the smart or the hybrid circuit breaker 5. If in step 1610(1) the signal is "turn ON" the subroutine D 1502(4) is executed. However, if the signal is "turn OFF" in step 1610(2) the subroutine C 1502(3) is executed. After the run of the subroutine D 1502(4) at the step 1505 an amp rating is determined. Next the flow of the flow chart 1500 of FIG. 15 is followed.

In operation, once the selection to turn the smart or the hybrid circuit breaker 5 ON is selected, a signal is sent from the cell phone APP 1600, thru Wi-Fi and to the smart or the hybrid circuit breaker 5. The subroutine D 1502(4) is initiated. A 24 VDC signal is sent to the mag-latch 230 for less than 5 milliseconds. This decreases the magnetic field strength and allows the contact arm 243 with contact to rotate counter-clockwise to close the main contacts 430. Once the main contacts 430 are closed, the software module determines the amp rating for the smart or the hybrid circuit breaker 5 from a micro SD card. A self test is conducted. If the self test passes, the current level is monitored and checked for a thermal overload and/or whether an instantaneous condition exists. If the thermal overload is determined to be 1.25% and/or the instantaneous levels are below 10x the smart or the hybrid circuit breaker 5 rating, the subroutine "A" 1502(1) is started. In the event. If the thermal overload is higher than 1.25% and/or the instantaneous levels are higher than 10x of the smart or the hybrid circuit breaker 5 rating, the subroutine "B" 1502(2) will be initiated. In this routine, the mag-latch 230 is activated with a 24 VDC signal to open the main contacts 430. Depending on the subroutine initiated, a predetermine message is displayed on the display screen to indicate the smart or the hybrid circuit breaker 5 is ON or OFF along with the current and voltage that is being applied to the smart or the hybrid circuit breaker 5. This same message is sent to the cell phone APP 1600 thru Wi-Fi and a receiver in the cell phone. If no SD card is installed then the software module starts the subroutine "C" 1502(3). In the C subroutine, the mag-latch 230 receives a 24 VDC signal for 25 milliseconds. This increases the magnetic field strength and attracts the mag-latch plunger. This magnetic force will overcome the torque applied from the torsion spring to the moveable arm with contact. The moveable contact arm rotates clockwise and separates the main contacts 430. A predetermined message is displayed in the display screen to alert the consumer.

To turn the smart or the hybrid circuit breaker 5 OFF, the OFF selection is made using the cell phone APP 1600. A signal is sent from the cell phone, through Wi-Fi and to the smart or the hybrid circuit breaker 5. The subroutine "C" 1502(3) will be initiated. In the C subroutine, the mag-latch 230 receives a 24 VDC signal for 25 milliseconds. This increases the magnetic field strength and attracts the mag-latch plunger. This magnetic force will overcome the torque applied from the torsion spring to the moveable arm with contact. The moveable contact arm rotates clockwise and separates the main contacts 430. A predetermined message is displayed in the display screen to alert the consumer. This same message is sent to the cell phone APP 1600 through Wi-Fi and a receiver in the cell phone.

Figure 17:
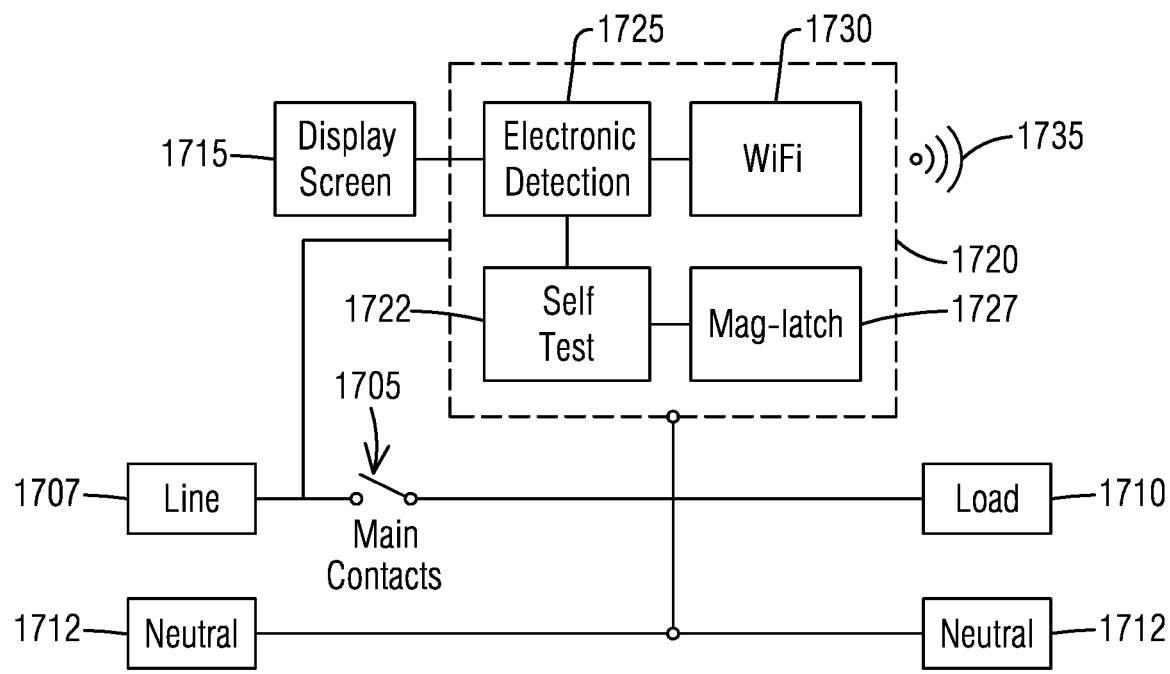
FIG. 17 illustrates a self-test setup for the smart or a hybrid circuit breaker 5 in accordance with an exemplary embodiment of the present invention.

FIG. 17 illustrates a self-test setup for the smart or a hybrid circuit breaker 5 in accordance with an exemplary embodiment of the present invention. Main contacts 1705 are provided between a line 1707 and a load 1710 across a neutral 1712. A display screen 1715 is provided. A module 1720 includes a self-test module 1722 and an electronic detection module 1725. The self-test module 1722 is connected to a mag-latch 1727 and the electronic detection module 1725 is connected to a Wi-Fi module 1730. A signal 1735 is sent by the module 1720.

In operation, the smart or a hybrid circuit breaker 5 begins to conduct self-test and/or arc detection once installed. If the self-test does not pass or an arc is detected on the line 1707, a 24 VDC is not sent to the mag-latch 1727 to close the circuit. If the smart or a hybrid circuit breaker 5 is closed and a self-test non-conforms, an arc is detected on the line 1707, overload and/or high instantaneous condition exists, a signal is sent to the mag-latch 1727 to open the circuit. In either condition, a microprocessor would send a signal to the Wi-Fi module 1730 to display a message to the display screen 1715 and indicate "On" to "Open" condition. In the algorithm, preset error messages would be programmed based on the various methods of tripping. In addition, a signal is sent to the Wi-Fi module 1730 and subsequently received by a cell phone receiver. The same message is displayed in a cell phone application (APP).

Figure 18:
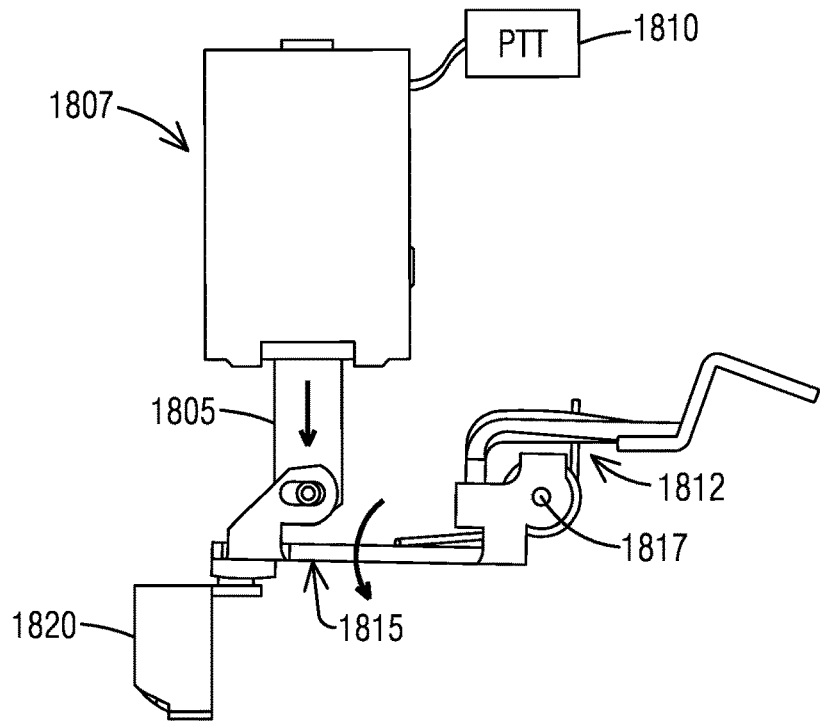
FIG. 18 illustrates the smart or a hybrid circuit breaker 5 mechanism in an ON position in accordance with an exemplary embodiment of the present invention.

FIG. 18 illustrates the smart or a hybrid circuit breaker 5 mechanism in an ON position in accordance with an exemplary embodiment of the present invention. A mag latch plunger 1805 is shown in an extended position. A mag-latch 1807 receives a 24 VDC signal that is initiated from several conditions. The signal can be triggered due to a signal from the cell phone APP or a by pressing a Push-To-Test button (PTT) 1810. Algorithm in a microprocessor would include pre-setting to display a message for either of these conditions. Using the cell phone APP, a signal would be transmitted to a Wi-Fi module to initiate a signal to the mag-latch 1807. As an alternate, a Push-To-Test event would also send a signal to the mag-latch 1807 that would open the circuit. Once either of these conditions is met, a 24 VDC signal is sent to the mag-latch 1807 for less than 5 milliseconds. This decreases the magnetic field strength and allows a torsion spring 1812 to rotate a contact arm or a movable arm with a contact 1815 counter-clockwise. The contact arm with contact 1815 rotates about a pivot pin 1817. The pivot pin 1817 can be made of stainless steel material while the contact arm could be made of a copper alloy such as CDA260. The torsion spring 1812 applies a 1.41±0.1 inch-pound torque to the moveable arm with contact. The moveable arm with contact rotation is stopped when the moveable arm with contact touches a stationary terminal with contact 1820. Once the current path has been completed, a message would be sent to a display screen and would switch from "Open" to "On." In the algorithm, preset messages would be programmed based on the circuit closing. A signal is sent to the Wi-Fi module and subsequently received by a cell phone receiver. The same message is displayed in the cell phone APP.

Figure 19:
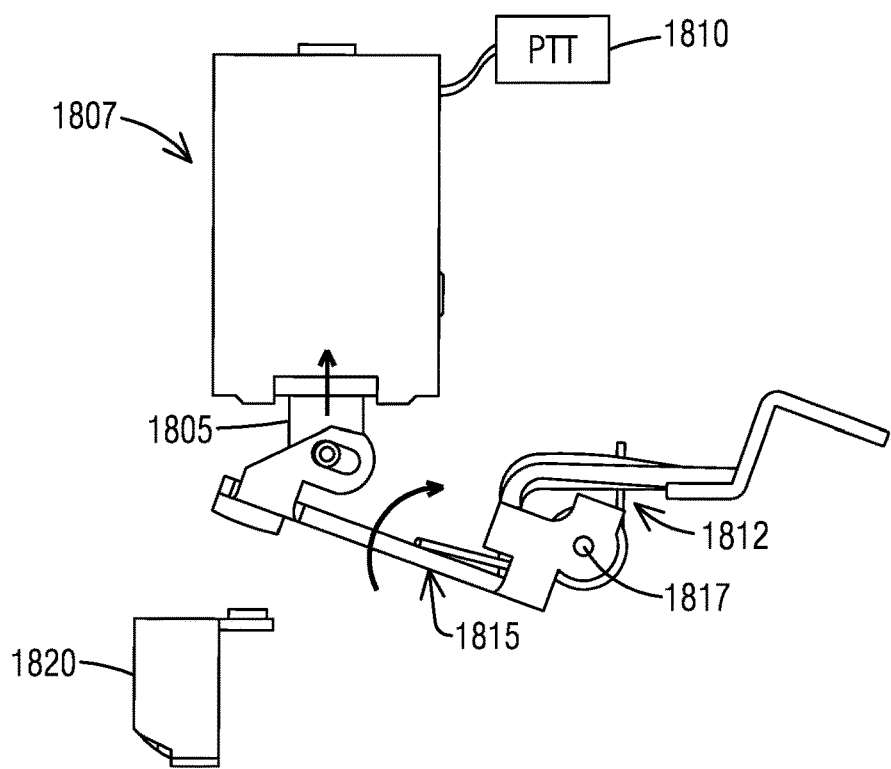
FIG. 19 illustrates the smart or a hybrid circuit breaker 5 mechanism in an OFF position in accordance with an exemplary embodiment of the present invention.

FIG. 19 illustrates the smart or a hybrid circuit breaker 5 mechanism in an OFF position in accordance with an exemplary embodiment of the present invention. The mag latch plunger 1805 is shown in a retracted position. The mag-latch 1807 receives a 24 VDC signal that is initiated from several conditions. The signal can be triggered due to Arc Fault or Ground Fault condition, self test non-conformance, thermal over load, high instantaneous, signal from the cell phone APP application, and/or a by pressing the Push-To-Test button (PTT) 1810. An overload condition would be controlled in an algorithm and could be set at 1.25±8% times the circuit breaker rating. An instantaneous condition would be controlled in the algorithm and could be set at 8-10 times the circuit breaker rating. The circuit breaker rating would be determined by the number of contacts exposed on a micro SD card. Alternate means of determining the circuit breaker rating could be The PCBA (printed circuit board assembly) to include a microprocessor with software that will communicate with the Wi-Fi module). The Wi-Fi module in the cell phone or computer will send a signal of what amperage rating to use in the smart or a hybrid circuit breaker 5 and that will be received by the breaker PCB Wi-Fi receiver and send a signal to the software to program the smart or a hybrid circuit breaker 5 amperage. A third option to determine the circuit breaker rating could be that the amperage rating of the breaker is adjusted directly to the breaker from where the breaker will have some feature(s) where the end user can adjust the amperage rating directly in the device and a mechanical/electronic interface located in the PCB that will send the signal to the PCB software. Once any of these conditions are met, a 24 VDC signal is sent to the mag-latch 1807 for 25 milliseconds. This increases the magnetic field strength and attracts the mag-latch plunger 1805 with a force of 5.0±0.2 pounds. This magnetic force will overcome the torque applied from the torsion spring 1812 to the moveable arm with contact 1815. The moveable arm with contact 1815 rotates clockwise about the pivot pin 1817 and therefore separates the contacts. The pivot pin 1817 can be made of stainless steel material while the contact arm could be made of a copper alloy such as CDA260. Once the current path has been broken, a message would be sent to the display screen that would switch from "On" to "Open." In the algorithm, preset messages would be programmed based on the various method of tripping. In addition, a signal is sent to the Wi-Fi module and subsequently received by the cell phone receiver. The same message is displayed in the cell phone APP.

While a smart circuit breaker in a residential configuration is described here a range of other constructions of circuit breaker are also contemplated by the present invention. For example, other types of circuit breakers may be implemented based on one or more features presented above without deviating from the spirit of the present invention.

The techniques described herein can be particularly useful for an integrated circuit breaker as a hybrid or a smart device that incorporates a solid-state circuit element integrated into a simplified mechanical pole having main contacts. While particular embodiments are described in terms of such an integrated circuit breaker configuration, the techniques described herein are not limited to a single pole or a partially electronic form but can also be used with other suitable forms.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The invention claimed is:

1. A smart circuit breaker comprising:
   a wireless communication module configured to communicate with an application (APP) stored on a mobile device of a user;
   a storage device to store a software module comprising instructions to be executed by a controller, the software module configured to monitor the smart circuit breaker for at least one of arc, ground fault, overload or increased instantaneous levels;
   a hybrid assembly that incorporates a solid-state circuit element integrated into a simplified mechanical pole having main contacts, wherein the solid-state circuit element includes a printed circuit board (PCB) with a micro SD reader to provide a signal for faster opening speeds and wherein the smart circuit breaker is configured for use for different current levels and controlled by the PCB, and wherein the PCB includes a microprocessor and the software module comprising the instructions to communicate with the wireless communication module;
   a mag-latch, wherein the PCB is configured to send a signal to the mag-latch to open and close the main contacts within microseconds of detecting an overcurrent; and
   a micro SD card that determines an amp rating of the smart circuit breaker by a number of exposed active pins, wherein the software module is configured to identify the number of exposed active pins and based on one or more preset conditions identify the amp rating.

2. The smart circuit breaker of claim 1, wherein the software module monitors the at least one of arc, ground fault, overload or increased instantaneous levels to communicate a breaker signal to the wireless communication module being a Wi-Fi module, wherein the breaker signal is then transmitted to a receiver in the mobile device being a cell phone such that the APP receives the breaker signal and displays predetermined information sent from the wireless communication module.

3. The smart circuit breaker of claim 1, wherein based on one or more preset conditions the mag-latch is activated to open the contacts of the smart circuit breaker.

4. The smart circuit breaker of claim 1, further comprising:
   a push to test button to manually turn the smart circuit breaker ON or OFF.

5. The smart circuit breaker of claim 1, wherein the APP is configured to send a first signal to the wireless communication module such that the software module receives the first signal from the APP in order to send a second signal to the mag-latch to open or close.

6. The smart circuit breaker of claim 1, wherein the software module to determine an amp rating of the smart circuit breaker using a micro SD card such that a Wi-Fi module in the mobile device is configured to send a signal of an amperage rating to use in the smart circuit breaker to the wireless communication module of the PCB which sends a signal to the software module to program the amperage rating to use.

7. The smart circuit breaker of claim 1, wherein the wireless communication module is integrated into the smart circuit breaker to provide a signal to be received in the mobile device being a cell phone.

8. The smart circuit breaker of claim 1, wherein the mag-latch is directly connected to a moveable contact arm with a contact and wherein the main contacts are separated using a signal that is sent to the mag-latch.

9. The smart circuit breaker of claim 1, further comprising:
   a push to test button to manually send a signal to the mag-latch to open or close the main contacts.

10. The smart circuit breaker of claim 1, further comprising:
    a display to visually show at least one of status and error messages of the smart circuit breaker.

11. The smart circuit breaker of claim 1, wherein a cradle to armature latch surface of the smart circuit breaker is not provided.

12. The smart circuit breaker of claim 1, wherein a bimetal of the smart circuit breaker is not provided and therefore does not require a thermal calibration in a factory.

13. The smart circuit breaker of claim 1, wherein the smart circuit breaker provides a user with a direct breaker status without the need to locate and open a panel door.

14. The smart circuit breaker of claim 1, further comprising:
    a first self-test module comprising instructions that if not functioning properly will automatically open the main contacts and disable the smart circuit breaker; and
    a second self-test module comprising instructions that if not functioning properly will prevent the mag-latch from receiving a signal to close the main contacts.

15. The smart circuit breaker of claim 1, wherein the smart circuit breaker is configured to alert an end user that a breaker trip has occurred or that there is an issue with a circuit breaker operation.

16. The smart circuit breaker of claim 1, wherein the smart circuit breaker is configured to provide an ability to change an amp rating by swapping out a micro SD card.

* * * * *